United States Patent
Santillan gutierrez et al.

(10) Patent No.: US 10,632,883 B2
(45) Date of Patent: Apr. 28, 2020

(54) MULTIFUNCTIONAL SEAT BRACKET FOR VEHICULAR SEATING ASSEMBLY

(71) Applicant: Ford Global Technologies, LLC, Dearborn, MI (US)

(72) Inventors: Diego Santillan gutierrez, Tizayuca (MX); Fernando Paisano, San Andres Cholula (MX); Federico Perez Lecuona, Mexico City (MX); Ignacio Bautista, Nicolas Romero (MX)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 15/880,079

(22) Filed: Jan. 25, 2018

(65) Prior Publication Data
US 2019/0225126 A1    Jul. 25, 2019

(51) Int. Cl.
*B60N 2/60* (2006.01)
*B60N 2/68* (2006.01)
*B60N 2/42* (2006.01)
*F16M 13/02* (2006.01)
*H01R 13/73* (2006.01)
*B60N 2/02* (2006.01)
*B60N 2/56* (2006.01)
*A47C 7/62* (2006.01)

(52) U.S. Cl.
CPC ............ *B60N 2/68* (2013.01); *B60N 2/4249* (2013.01); *B60N 2/682* (2013.01); *F16M 13/02* (2013.01); *H01R 13/73* (2013.01); *A47C 7/626* (2018.08); *B60N 2/0224* (2013.01); *B60N 2/56* (2013.01); *H01R 2201/26* (2013.01)

(58) Field of Classification Search
CPC ........ B60N 2/68; B60N 2/4249; F16M 13/02; H01R 13/73; A47C 7/626
USPC .................................................... 297/188.08
See application file for complete search history.

(56) References Cited

U.S. PATENT DOCUMENTS

| | | | |
|---|---|---|---|
| 4,844,533 A * | 7/1989 | Dowd | B60J 3/0208 296/214 |
| 4,882,842 A | 11/1989 | Basson et al. | |
| 5,805,402 A | 9/1998 | Maue et al. | |
| 6,161,891 A | 12/2000 | Blakesley | |
| 6,352,304 B1 * | 3/2002 | Sorgenfrei | B60R 21/207 280/730.2 |
| 6,412,874 B1 * | 7/2002 | Mayer | B60N 2/002 297/452.18 |
| 7,530,631 B2 * | 5/2009 | Skelly | B60N 2/62 297/188.08 |
| 7,775,603 B2 * | 8/2010 | Mundell | B60N 2/7052 297/452.52 |
| 7,971,931 B2 | 7/2011 | Lazanja et al. | |
| 9,793,659 B2 * | 10/2017 | Seger | H02G 3/20 |
| 9,878,680 B2 * | 1/2018 | Mita | B60R 16/0215 |

(Continued)

*Primary Examiner* — Syed A Islam
(74) *Attorney, Agent, or Firm* — David Coppiellie; Price Heneveld LLP

(57) ABSTRACT

A vehicular seat bracket assembly is provided that includes a bracket body comprising a plurality of retention features and a forwardly disposed tab, each configured to couple the bracket body to a seat pan. The bracket assembly also includes a plurality of clasps on the body configured to couple the body to a lateral support member of a seat. The plurality of clasps also includes a plurality of flexing members configured to dissipate variations in seat loads.

19 Claims, 5 Drawing Sheets

(56) References Cited

U.S. PATENT DOCUMENTS

| | | | | |
|---|---|---|---|---|
| 9,919,803 B2* | 3/2018 | Pozzi | ................. | B64D 11/0636 |
| 10,259,362 B2* | 4/2019 | Penn | .................... | B60N 2/5825 |
| 2008/0106127 A1* | 5/2008 | Hough | ................... | B64D 11/06 |
| | | | | 297/188.08 |
| 2009/0015043 A1* | 1/2009 | Macht | ................ | B60H 1/00285 |
| | | | | 297/180.14 |
| 2011/0241403 A1* | 10/2011 | Yamaguchi | .......... | B60N 2/4228 |
| | | | | 297/452.31 |
| 2013/0113241 A1* | 5/2013 | Tsuchiya | ............. | B60N 2/5825 |
| | | | | 297/188.04 |
| 2013/0119715 A1* | 5/2013 | Medoro | ................. | B60N 2/686 |
| | | | | 297/180.1 |
| 2015/0232009 A1* | 8/2015 | Jamieson | ............... | B60N 2/682 |
| | | | | 297/452.18 |
| 2017/0036575 A1* | 2/2017 | Kobayashi | ............... | B60N 2/68 |
| 2017/0305303 A1* | 10/2017 | Yadav | ................. | B60N 2/0232 |
| 2017/0313224 A1* | 11/2017 | Akaike | ................... | B60N 2/68 |

* cited by examiner

US 10,632,883 B2

MULTIFUNCTIONAL SEAT BRACKET FOR VEHICULAR SEATING ASSEMBLY

FIELD OF THE INVENTION

The present invention generally relates to a vehicular seat bracket assembly, and more particularly, a vehicular seat bracket assembly for universally coupling to a plurality of differing electronic modules.

BACKGROUND OF THE INVENTION

Vehicular seating assemblies are capable of performing various functions to improve the seating conditions for a passenger. The vehicular seating assemblies require individual modules in close proximity to the seating assembly in order to carry out these functions. Each module is generally coupled to a seating assembly by way of a bracket. As such, multiple modules in seating assemblies each require their own brackets in order to be coupled to the seating assembly, which in turn can take up a considerable amount of space.

Therefore, it would be useful to provide an improved bracket assembly capable of connecting multiple modules of various dimensions to a vehicular seating assembly.

SUMMARY OF THE INVENTION

According to a first aspect, a vehicular seat bracket assembly is provided that includes: a bracket body comprising a plurality of retention features and a forwardly disposed tab, each configured to couple the bracket body to a seat pan; and a plurality of clasps on the body configured to couple the body to a lateral support member of a seat. The plurality of clasps also includes a plurality of flexing members configured to dissipate variations in seat loads.

Embodiments of the first aspect can include any one or a combination of the following:
at least one of the plurality of retention features includes a J-retainer configured to couple the bracket body to a seat trim and the seat pan;
at least one of the plurality of retention features includes a self-tapping screw;
at least one of the plurality of retention features includes a projection configured to be received by a slot of the seat pan;
each of the plurality of retention features and the forwardly disposed tab is universally configured to couple to each of an outboard, inboard, passenger or driver seat including a seat pan;
the plurality of clasps comprise arc snaps configured to couple the bracket body to a vehicular seat submarine bar; and
the bracket body includes a composition comprising a recycled silicon-containing material.

According to a second aspect, a vehicular seat bracket assembly is provided that includes: a bracket body comprising a plurality of retention features and a forwardly disposed tab, each configured to couple the bracket body to a seat pan; and a plurality of attachment points on the body, each configured for connecting to each of a heat sink, a USB, and a cooling module.

Embodiments of the second aspect can include any one or a combination of the following features:
the bracket body further includes a projection configured to be received by a slot of the seat pan and a self-tapping screw proximate to the slot and configured to couple the bracket body to the seat pan;
each of the plurality of retention features and the forwardly disposed tab is universally configured to couple to each of an outboard, inboard, passenger or driver seat including a seat pan;
any one of the plurality of retention features includes a clasp configured to couple the body to a lateral support member;
the bracket is configured to simultaneously connect to each of a heat sink, a USB, and a cooling module;
the body further includes a universal control module for operable coupling to each of a heat sink, a USB and a cooling module;
each of the heat sink, USB and cooling modules is of differing dimensions than the other modules; and
the bracket body includes a composition comprising a recycled silicon-containing material.

According to a third aspect, a vehicular seat bracket assembly is provided that includes: a bracket body comprising a plurality of retention features for coupling to a seat pan; a plurality of attachment points on the body, each universally configured for connecting to each of a heat sink, a USB, and a cooling module; and a plurality of clasps on the body including a plurality of flexing members that are configured to dissipate variations in seat loads.

Embodiments of the third aspect can include any one or a combination of the following features:
each of the plurality of retention features is universally configured to couple to each of an outboard, inboard, passenger or driver seat including a seat pan;
at least one of the plurality of retention features includes a projection configured to be received by a slot of the seat pan;
each of the heat sink, USB and cooling modules is of differing dimensions than the other modules; and
the bracket body includes a composition comprising a recycled silicon-containing material.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
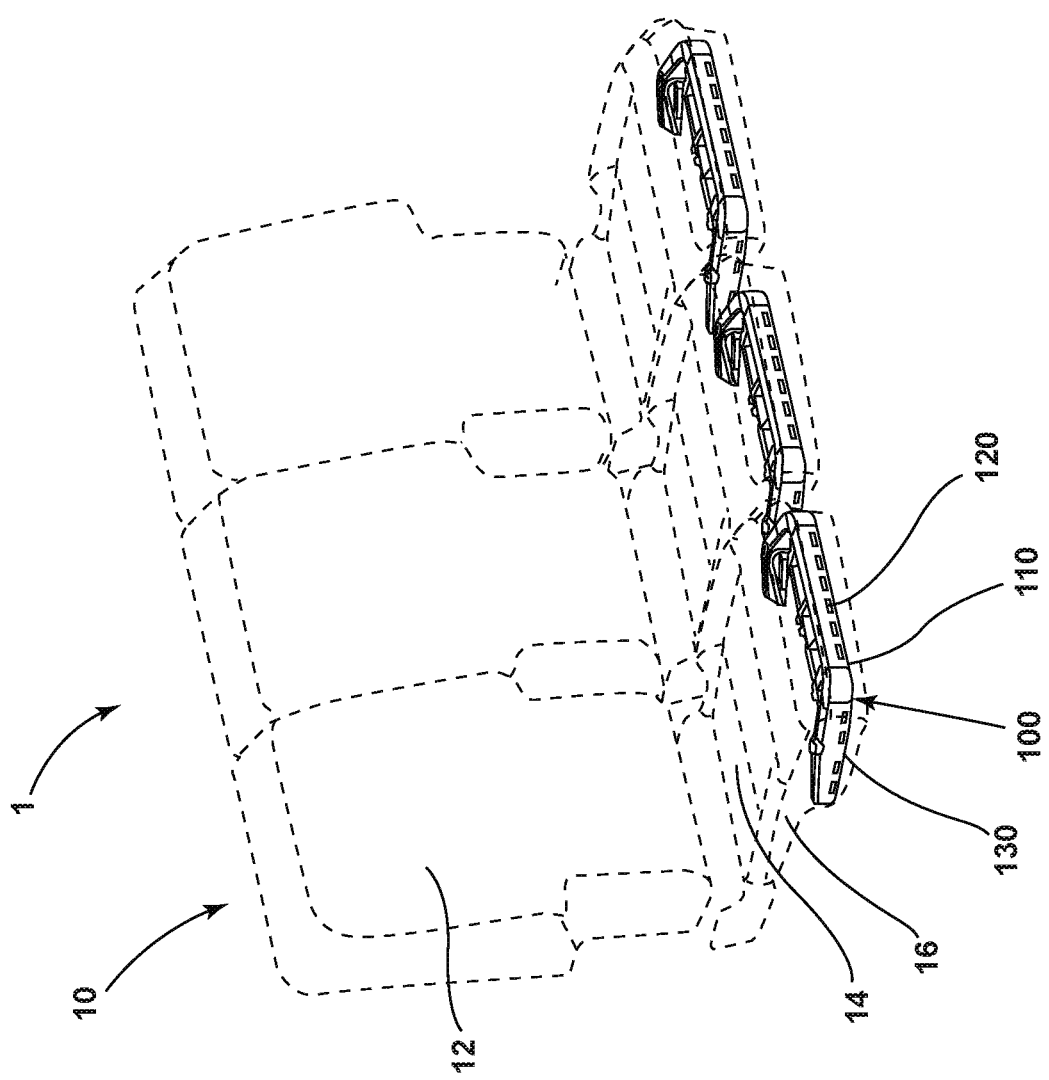
FIG. 1 is a perspective view of a vehicular seating assembly including a bracket assembly, according to an embodiment.

For purposes of description herein, the terms "upper," "lower," "right," "left," "rear," "front," "vertical," "horizontal," "interior," "exterior," "vehicular forward," "vehicular rearward" and derivatives thereof shall relate to the invention as oriented in FIG. 1. However, the invention may assume various alternative orientations, except where expressly specified to the contrary. Also, the specific devices and assemblies illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The following disclosure describes a bracket assembly for a vehicular seat. In some embodiments, the vehicular seat bracket assembly includes a bracket body having a plurality of retention features for coupling the bracket assembly to a seat pan. The plurality of retention features is disposed at various positions on the bracket body and is adapted to enable universal coupling of the bracket assembly to a vehicular seat configured with a seat pan. A plurality of attachment points on the bracket body are each configured for connecting to each of a heat sink, a USB, and a cooling module. Each of the plurality of attachment points corresponds to a different position on the bracket body, which may be more or less proximate to the seat pan. The various positions of the attachment points enable the individual bracket assembly to couple to multiple electronic modules of varying dimensions to a vehicular seating assembly. In some aspects, the bracket body includes a plurality of clasps, with each clasp including a plurality of flexing members that are configured to dissipate variations in seat loads associated with the seat. The clasps may be configured as arc snaps that include flexing members. The flexing members are biased towards a stationary position of a lateral support member and are configured to flex in response to load forces of the seating assembly without the bracket assembly experiencing shattering or breakage.

Referring to FIG. 1, a vehicular seating assembly 1 is shown. The vehicular seating assembly 1 includes a vehicular seat 10 having a seatback 12 and a seat base 14, and is configured for use in a motor vehicle. The vehicular seat 10 may correspond to a driver seat or a passenger seat, located in a front, middle, or rear passenger compartment. The seatback 12 may be rotatably coupled to the seat base 14 via a pivoting assembly (not shown). The seat base 14 is supported by a seat pan 16. A bracket assembly 100 is disposed below the seat base 14 and coupled to the seat pan 16. The bracket assembly 100 includes a bracket body 110 having a front portion 120 and a rear portion 130. The front portion 120 includes at least one forwardly disposed tab 140 (see FIG. 2) configured to couple the bracket body 110 to the seat pan 16.

Figure 2:
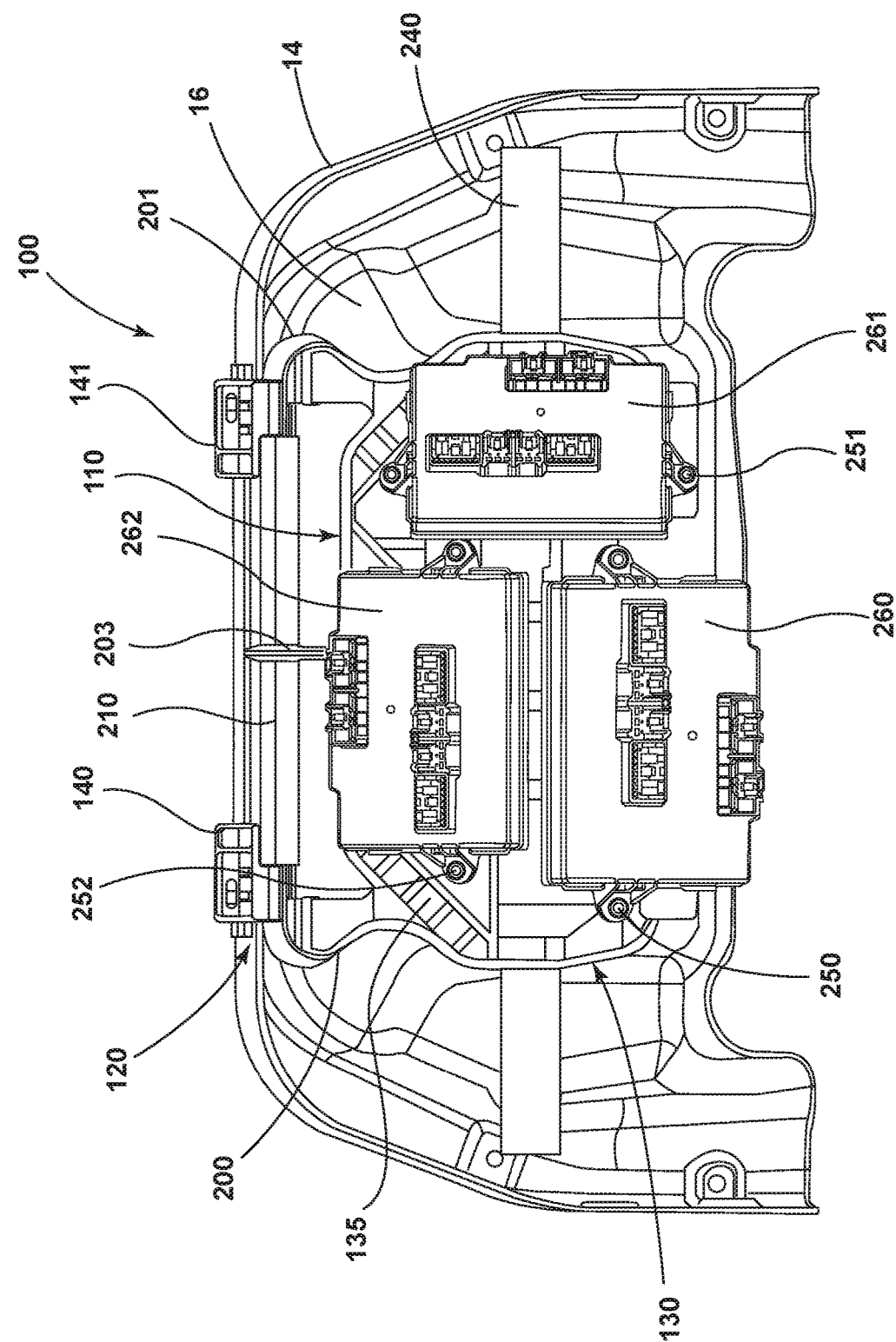
FIG. 2 illustrates the underside of a bracket assembly comparable to the assembly depicted in FIG. 1, as coupled to each of a heat sink, cooling, and USB module, according to an embodiment.

Referring to FIG. 2, the bracket assembly 100 is shown coupled to the underside of a vehicular seat pan 16. The rear portion 130 of the bracket body 110 is disposed below the seat base 14, and has a front surface 135 angled towards the front portion 120 of the bracket body 110 and the seat pan 16. The rear portion 130 of the bracket body is proximate to a lateral support member 240 that extends transversely across the vehicular seat 10 (see FIG. 1). The lateral support member 240 is positioned between the seat pan 16 and the rear portion 130 of the bracket body 110. In the depicted embodiment of the bracket assembly 100, the rear portion 130 of the bracket body 110 has a substantially rectangular configuration. However, it will be understood that alternative configurations of the rear portion 130 of the bracket body 110 are possible in order to accommodate dimensional variances of electronic modules coupled to the bracket assembly 100, as will later be discussed in detail.

Referring again to the bracket assembly 100 shown in FIG. 2, the front portion 120 of the bracket body 110 includes a first and second arm 200, 201 forwardly extending from the left and right sides of the rear portion 130 of the bracket body 110, respectively. An intermediate member 210 is positioned between and extends approximately orthogonally between the first and second arms 200, 201. An intermediate arm 203 may extend orthogonally from the intermediate member 210 and parallel to the first and second arms 200, 201 to provide additional stability between the front portion 120 and rear portion 130 of the bracket body 110. A first and a second tab 140, 141 extend orthogonally from the front portion 120 of the bracket body 110. The first and second tabs 140, 141 are positioned proximate to the first and second arms 200, 201 and extend vertically from the intermediate member 210 and into the page.

With continued reference to FIG. 2, the bracket body 110 includes a plurality of attachment points, shown as a first, a second and a third attachment point 250, 251 and 252, respectively. Each of attachment points 250, 251, 252 is adapted to couple the bracket assembly 100 to a plurality of electronic modules of varying dimensions. In the depicted embodiment, attachment points 250, 251, 252 are each universally configured for connecting the bracket assembly 100 to each of a heat sink module 260, a USB module 261, and a cooling module 262. As such, each of the attachment points 250, 251, 252 can be configured to connect to each of a heat sink module 260, USB module 261, and a cooling module 262. The first and second attachment points 250, 251 are positioned proximate to the left and right periphery of the rear portion 130 of the bracket body 110, respectively. The third attachment point 252 is positioned on the front surface 135 of the rear portion 130 of the bracket body 110 and may be equidistant from the right and left arms 200, 201 and proximate to the intermediate arm 203. Additionally, the third attachment point 252 and front surface 135 are angled more or less proximate to the seat pan 16 than the first and second attachment points in order to accommodate dimensional variations of the modules.

Referring again to FIG. 2, the bracket assembly 100 and, more particularly, its bracket body 110, is adapted to universally connect to various types of modules (e.g., a heat sink module 260, a USB module 261, and a cooling module 262). This design flexibility advantageously allows the same bracket assembly 100 to be employed in various seats 10 of seating assemblies 1 (see FIG. 1), each of which having differing module connection requirements and needs. That is, the same bracket assembly 100 can be universally employed in various configurations of the vehicular seats 10, largely independent of the types of modules associated with these seats 10. More particularly, the bracket assembly 100, as including a plurality of attachment points 250, 251, 252, enables the use of multiple modules for a seating assembly without each module requiring an individual bracket assembly in order to couple to the seating assembly 1 (see FIG. 1). Although the illustrated embodiment depicts a heat sink module, USB module, and cooling module 260, 261 and 262, respectively, each attachment point is adapted to universally connect to various electronic modules, enabling the bracket assembly 100 to connect to additional or alternative modules of varying dimensions. For instance, attachment points 250, 251, 252 may couple to any one of the following modules: a third row module; a main connector for a center seat; a harness for the center seat; a seat trim cover outline; seat rotational adjustment modules; and other types of modules (not shown).

Figure 3:
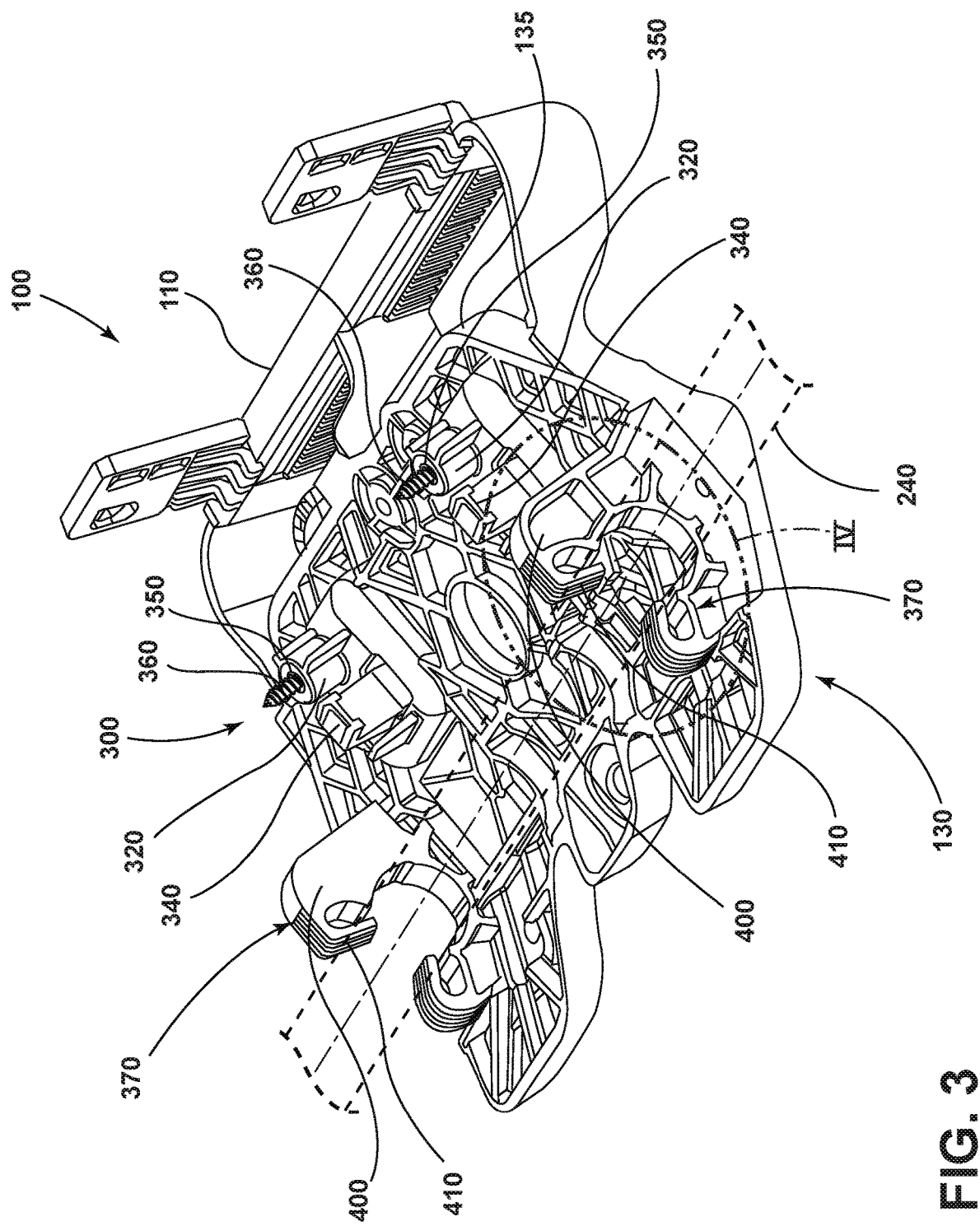
FIG. 3 illustrates the top of the bracket assembly depicted in FIG. 1, as uninstalled from a vehicular seat of a vehicular seating assembly, according to an embodiment.

Referring to FIG. 3, a perspective top view is provided of the bracket body 110 of the bracket assembly 100 (see FIGS. 1, 2). In particular, the top surface 300 of the bracket body 110 is positioned proximate to a bottom surface (not shown) of the seat pan 16 (e.g., as the bracket body 110 is coupled to the seat pan 16). The bracket body 110 includes a first set of retention features 320 positioned forward on the rear portion 130 of the bracket body 110 proximate to the front surface 135. The first set of retention features 320 includes a sliding projections 340 configured to be received by the seat pan 16. Screw holes 350 are proximate to the sliding projections 340 and include self-tampering screws 360 configured to couple the bracket body 110 to the seat pan 16. The sliding projections 340 are configured to hold the bracket assembly 100, and particularly the bracket body 110, in an installation position while the self-tapping screws 360 are installed and the bracket assembly 100 is secured to the seat pan 16. A second set of retention features 370 are positioned rearward on the rear portion 130 of the bracket body. The second set of retention features 370 includes clasps 400 proximate to the lateral support member 240. The clasps 400 are configured to couple the rear portion 130 of the bracket body 110 to the lateral support member 240.

Figure 4:
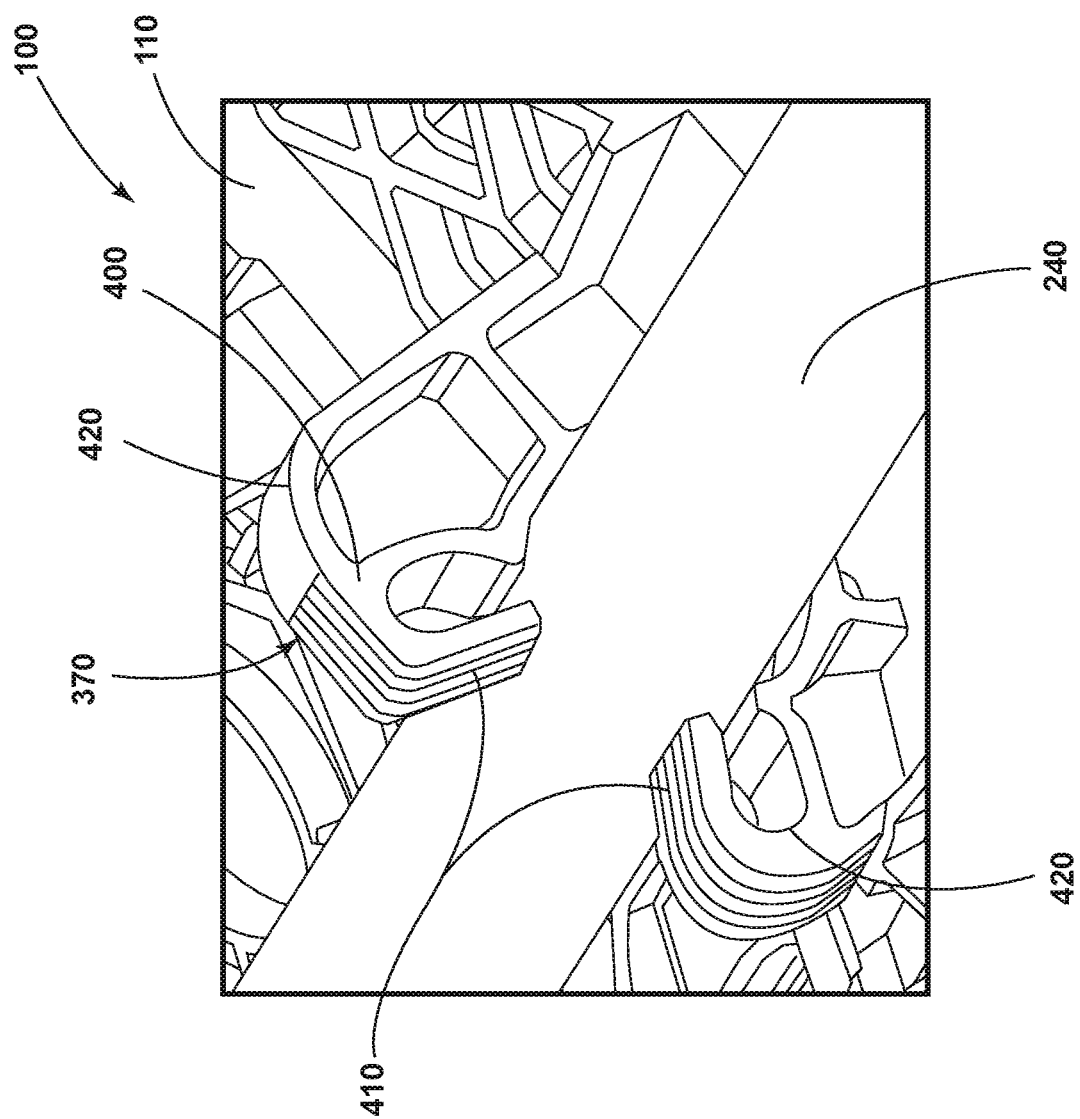
FIG. 4 illustrates a retention feature on the bracket assembly depicted in FIG. 3, as coupled to a lateral support member of a vehicular seating assembly, according to an embodiment.

Referring to FIG. 4, an enlarged view of the bracket body 110 is provided that shows a clasp 400 in greater detail. In particular, the clasp 400 is depicted as an arc snap configured to accept a portion of the lateral support member 240. The clasp includes a plurality of flexing members 410 (see also FIG. 3) that project from a clasp arm 420 to make contact with the lateral support member 240. The flexing members 410 are configured to grip the lateral support member 240 and couple the bracket body 110 to the seating assembly 1 (see FIG. 1). Further, the flexing members 410 are biased towards the stationary position of the lateral support member 240. Further, in response to load forces of the seating assembly 1, the flexing members 410 of the clasps 400 are configured to flex in order to dissipate loads on the bracket assembly 100 without decoupling from the lateral support member 240. For instance, in the event of a vehicle crash, the flexing members 410 are adapted to flex and counter the stress concentrations of the seating assembly 1 without fracturing or shattering of the bracket body 110 from the seat pan 16 (see FIGS. 1, 2).

Referring back to FIGS. 1-4, the bracket assembly 100, in some implementations, includes a bracket body 100 having a plurality of retention features 320 and at least one forwardly disposed tab 140, each configured to couple the bracket body 110 to the seat pan 16. The bracket assembly 110 may additionally include a plurality of attachment points 250, 251, 252 on the bracket body 100, each configured for connecting to each of the heat sink module 260, the USB module 261, and the cooling module 262. In some embodiments, the bracket assembly 100 may include a plurality of clasps 400 on the bracket body 110, the clasps 400 having a plurality of flexing members 410 configured to dissipate variations in loads associated with the vehicular seat 10 (e.g., from motion of the vehicle, a crash of the vehicle 1, etc.).

Figure 5:
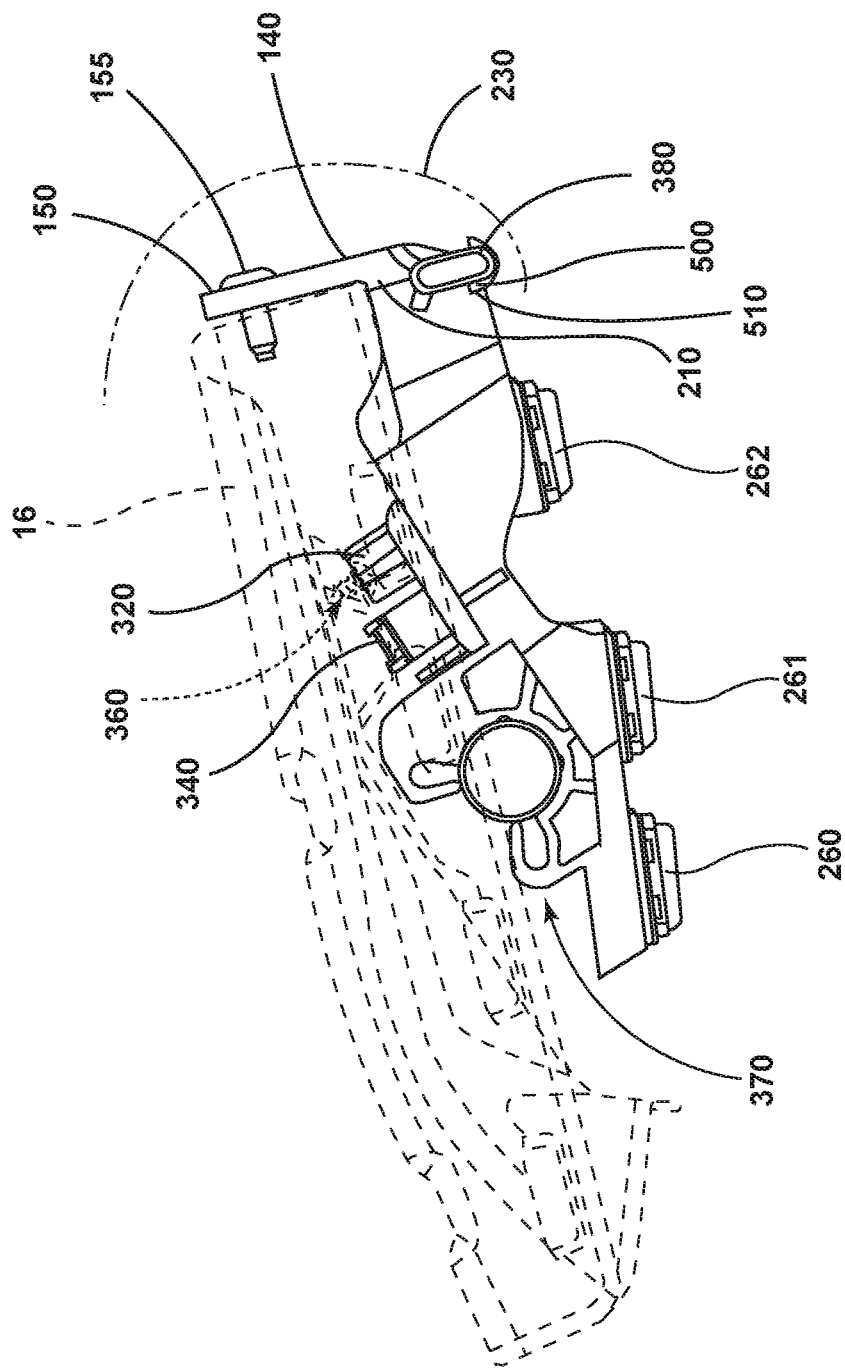
FIG. 5 depicts a cut-away view of the bracket assembly installed in the vehicular seating assembly of FIG. 1, according to an embodiment.

Referring to FIG. 5, the bracket assembly 100 is coupled to the seating assembly 1 (see FIG. 1), and electronic modules 260, 261, 262 are in connection with the bracket assembly 100 at attachment points 250, 251, 252 (see FIG. 2). The front tab 140 includes a screw 155 at attachment point 150 configured to couple the front tab 140 to the front of the seat pan 16. Shown in phantom is a seat trim 230 enclosing the front tab 140 of the bracket assembly 100. The intermediate member 210 includes a plurality of retainers 380 configured to couple the bracket assembly 100 to a seat trim 230. Retainers 380 are sewn to the seat trim 230 at stitching 510 and are configured to couple the seat trim 230 to the front portion 120 of the bracket body 110. The retainers 380 have a J-shaped feature that grasps the front portion 120 of the bracket body 110 at an edge 500, and the seat trim 230 is retained.

As shown in FIGS. 2 and 4-5, the bracket assembly 100 is configured to universally connect to each of the heat sink module 260, the USB module 261, and the cooling module 262. Further, the attachment points 250, 251, 252 are configured to connect the bracket assembly 100 to various modules, including a universal control module (not shown) for operable coupling to each of the heat sink module 260, USB module 261, and cooling module 262. As depicted in FIGS. 2 and 5, the bracket assembly 100 is capable of connecting to modules of varying shapes and dimensions. Further, the plurality of retention features 320 and forwardly disposed tab 140 are universally configured to couple to each of an outboard, inboard, passenger or driver seat comprising a seat pan 16. At least one of the plurality of retention features 320 may include a self-tapping screw 360 configured to couple the bracket body 110 to the vehicular seat 10. In addition, the bracket body 110 can include a projection 340 configured to be received by the seat pan 16. The projection 340 may be held by a slot (not shown) of the seat pan 16 and configured to hold the bracket assembly 100 in the installation position while the self-tapping screw 360 is installed.

With regard to its construction, the bracket assembly 100 shown in FIGS. 1-4 may be formed of seat plastic materials such as, but not limited to, nylon or polypropylene. Additionally, the bracket assembly 100 may be formed of a siliconized polymer, including a recycled silicon-containing material. In embodiments, the silicon-containing material is formed from recycled silicon-coated airbag waste. Such a process includes fine cutting an airbag fragment, chemical treatment of the polyamide-silicon bond, separation of the polyamide and silicone, and washing of the fibers prior to molding the bracket assembly 100.

Accordingly, a bracket assembly for a vehicular seat has been advantageously provided herein. The assembly includes attachment points for connecting to a plurality of electronic modules of varying configurations and dimensions. The assembly is configured with retention features that enable the assembly to be universally coupled to vehicle seats configured with a seat pan. Clasps on the body are coupled to a lateral support member extending transversely across the vehicular seating assembly and are configured to provide additional support in coupling the bracket assembly to the vehicular seating assembly. Flexing members on the clasps provide shatter resistance and prevent breakage of the assembly in the event of load forces of the seating assembly.

Certain recitations contained herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the components of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, components shown as integrally formed may be constructed of multiple parts, or elements shown as multiple parts may be integrally formed, the length or width of the structures may be varied, and the nature or numeral of adjustment positions provided between the components may be varied. It should be noted that the components may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A vehicular seat bracket assembly, comprising:
   a bracket body comprising a plurality of retention features, a plurality of attachment points, and a forwardly disposed tab, each configured to couple the bracket body to a seat pan, the plurality of attachment points comprising:
   a first pair of attachment points substantially disposed in a first direction that is defined by a vehicle forward to vehicle rearward direction and defining a first distance therebetween; and
   a second pair of attachment points substantially disposed in a second direction that is normal to the first direction defining a second distance therebetween, wherein the second distance differs from the first distance, and wherein each of the first and second pairs of attachment points is configured to universally couple the bracket body to at least two modules with varying dimensions of a plurality of modules having varying dimensions; and
   a plurality of clasps on the bracket body configured to couple the bracket body to a lateral support member of a seat and comprising a plurality of flexing members configured to dissipate variations in seat loads.

2. The vehicular seat bracket assembly of claim 1, wherein at least one of the plurality of retention features comprises a J-retainer configured to couple the bracket body to a seat trim and the seat pan.

3. The vehicular seat bracket assembly of claim 1, wherein at least one of the plurality of retention features comprises a self-tapping screw.

4. The vehicular seat bracket assembly of claim 3, wherein at least one of the plurality of retention features comprises a projection configured to be received by a slot of the seat pan.

5. The vehicular seat bracket assembly of claim 3, wherein each of the plurality of retention features and the forwardly disposed tab is universally configured to couple to each of an outboard, inboard, passenger or driver seat comprising the seat pan.

6. The vehicular seat bracket assembly of claim 1, wherein the plurality of clasps comprise arc snaps configured to couple the bracket body to a vehicular seat submarine bar.

7. The vehicular seat bracket assembly of claim 1, wherein the bracket body comprises a composition comprising a recycled silicon-containing material.

8. A vehicular seat bracket assembly, comprising:
   a bracket body comprising a plurality of retention features and a forwardly disposed tab, each configured to couple the bracket body to a seat pan; and
   a plurality of attachment points on the bracket body, the plurality of attachment points comprising:
   a first pair of attachment points substantially disposed in a first direction that is defined by a vehicle forward to a vehicle rearward direction and defining a first distance therebetween; and
   a second pair of attachment points substantially disposed in a second direction that is normal to the first direction defining a second distance therebetween, wherein the second distance differs from the first distance, and wherein each of the first and second pairs of attachment points is universally configured to couple at least two of a heat sink module, a USB module, and a cooling module to the bracket body, wherein each of the heat sink module, the USB module, and the cooling module have varying dimensions.

9. The vehicular seat bracket assembly of claim 8, wherein the bracket body further comprises a projection configured to be received by a slot of the seat pan and a self-tapping screw proximate to the slot configured to couple the bracket body to the seat pan.

10. The vehicular seat bracket assembly of claim 9, wherein each of the plurality of retention features and the forwardly disposed tab is universally configured to couple to each of an outboard, inboard, passenger or driver seat comprising the seat pan.

11. The vehicular seat bracket assembly of claim 9, wherein any one of the plurality of retention features comprises a clasp configured to couple the bracket body to a lateral support member.

12. The vehicular seat bracket assembly of claim 8, wherein the bracket is configured to simultaneously connect to each of a heat sink module, a USB module, and a cooling module.

13. The vehicular seat bracket assembly of claim 8, wherein the bracket body further comprises a universal control module for operable coupling to each of a heat sink module, a USB module, and a cooling module.

14. The vehicular seat bracket assembly of claim 8, wherein the bracket body comprises a composition comprising a recycled silicon-containing material.

15. A vehicular seat bracket assembly, comprising:
a bracket body comprising a plurality of retention features for coupling to a seat pan;
a plurality of attachment points on the bracket body, each attachment point of the plurality of attachment points universally configured for connecting to each of a heat sink module, a USB module, and a cooling module, the plurality of attachment points comprising:
    a first pair of attachment points substantially disposed in a first direction that is defined by a vehicle forward to vehicle rearward direction and defining a first distance therebetween; and
    a second pair of attachment points substantially disposed in a second direction that is normal to the first direction defining a second distance therebetween, wherein the second distance differs from the first distance; and
a plurality of clasps on the bracket body comprising a plurality of flexing members configured to dissipate variations in seat loads.

16. The vehicular seat bracket assembly of claim 15, wherein each of the plurality of retention features is universally configured to couple to each of an outboard, inboard, passenger or driver seat comprising the seat pan.

17. The vehicular seat bracket assembly of claim 16, wherein at least one of the plurality of retention features comprises a projection configured to be received by a slot of the seat pan.

18. The vehicular seat bracket assembly of claim 15, wherein each of the heat sink module, the USB module, and the cooling module are of differing dimensions.

19. The vehicular seat bracket assembly of claim 15, wherein the bracket body comprises a composition comprising a recycled silicon-containing material.

\* \* \* \* \*